March 28, 1944. J. LA VIA 2,345,203
SAFETY BRAKE FOR AUTOMOTIVE VEHICLES
Filed Nov. 15, 1941
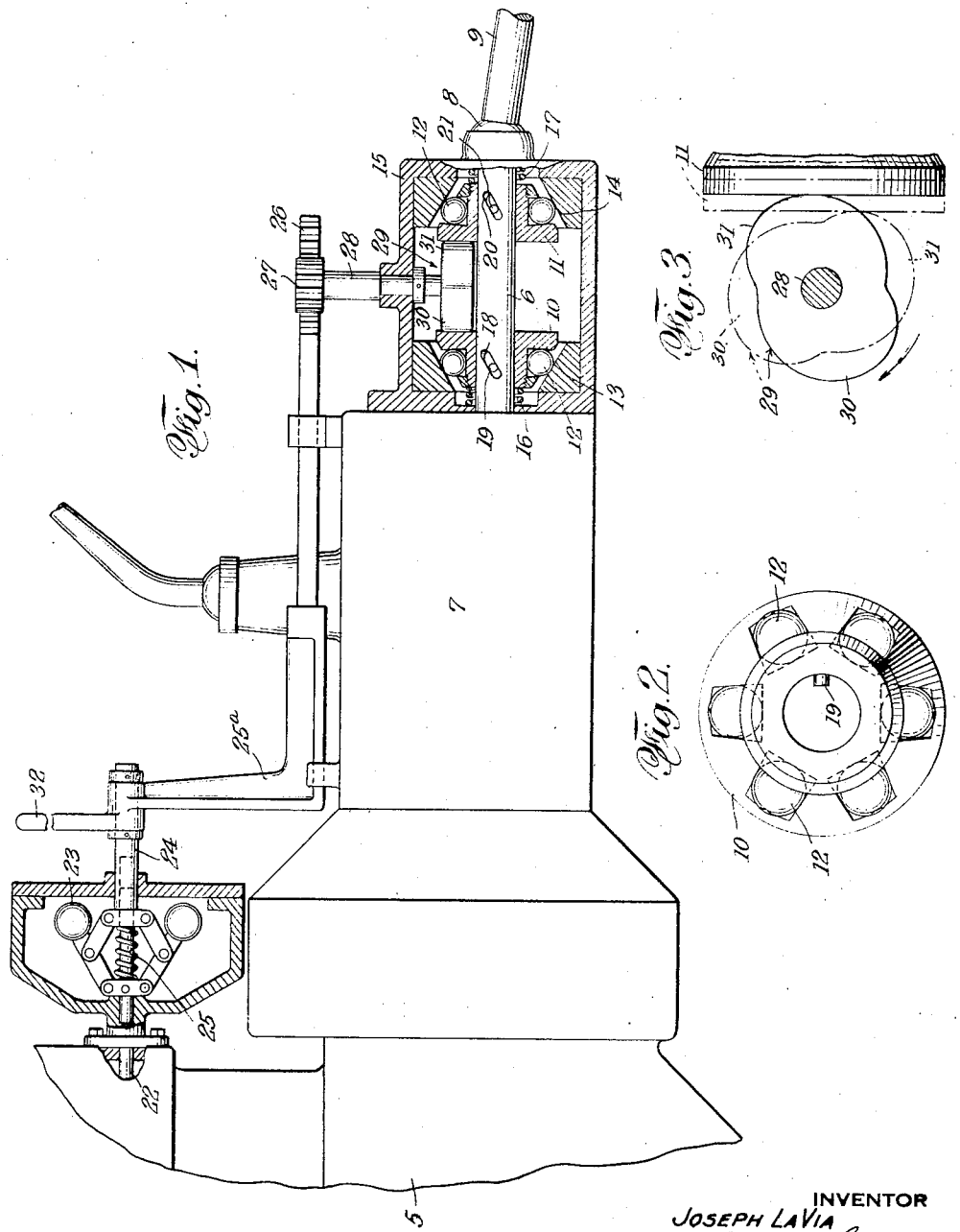
INVENTOR
JOSEPH LA VIA
BY *Percy Freeman*
ATTORNEY Patented Mar. 28, 1944

2,345,203

UNITED STATES PATENT OFFICE 2,345,203

SAFETY BRAKE FOR AUTOMOTIVE VEHICLES

Joseph La Via, Ridgewood, N. Y.

Application November 15, 1941, Serial No. 419,264

3 Claims. (Cl. 188—167)

This invention relates to means for safely holding a parked vehicle upon a grade, the principal object of the invention residing in the provision of means to prevent accidental movement of a vehicle down a grade no matter in which direction the vehicle is pointed., Many accidents have occurred because a parked vehicle, whether by accidental release of its brakes or by impetus initiated by an outside force, rolled down grade out of control. Attempts have been made to provide means for preventing such motion in a forward direction with regard to the front of the vehicle. However, of equal importance, and for the sake of complete safety, it is desirable to prevent such motion rearward since vehicles are as frequently parked up grade as down grade.

An important object of the invention, therefore, is to provide means for effectively locking the drive or propeller shaft of a parked vehicle whereby said vehicle cannot move either forward or backward on an up or down grade.

The invention is particularly applicable to automotive vehicles, the invention, therefore, contemplating the provision of means automatically locking the propeller shaft of such vehicles when its engine is not operating, and automatically releasing said shaft when the engine is operating.

To meet the fire laws of various communities, the invention further contemplates the provision of means for manually releasing the propellor shaft so that the vehicle may be moved from a site of danger.

The foregoing and other objects, features and advantages of the invention, will become evident from the following specification in which the invention is described with regard to the illustrated embodiment thereof in the accompanying drawing which is intended as exemplary only of the invention.

In the drawing:

Fig. 1 is a side elevational view showing the invention applied to an automobile engine and propellor shaft, parts being shown in section and the engine being fragmentary.

Fig. 2 is an end view of a clutching unit employed in the present locking means.

Fig. 3 is a plan view of cam means employed for moving the clutching means.

In that embodiment of the invention which is illustrated, the engine 5 serves to drive the shaft 6 through the medium of a transmission mechanism 7, said shaft being connected as through the universal joint 8 to a drive or propellor shaft 9. The latter shaft in the usual way serves to drive the wheels of an automotive vehicle as can be well understood.

When such a vehicle is parked on a grade, and should the parking brakes thereof become released or loosened, the momentum of a vehicle weighing several thousand pounds could cause considerable damage, the present invention contemplating means for preventing such accidental motion of a parked vehicle.

Means are provided for locking the shaft 6 and thus the propellor shaft 9 to prevent rotation thereof in either direction whereby a vehicle parked on a grade is prevented from rolling down such grade either forward or backward. In the present instance, it is preferred to use means such as the clutch members 10 and 11, each carrying a plurality of balls or rollers 12 having respective cooperative engagement with the conical seats 13 and 14 fixedly held as in a casing 15 fixed to the rear of the transmission unit 7. Spring means such as shown at 16 and 17 or similar means may be employed to urge the respective clutch members 10 and 11 in a direction to cause the balls or rollers 12 to be held out of contact with the respective conical seats 13 and 14.

While the use of one of such clutching means may in some instances be effective, it is preferred to use two, as illustrated, so that each may effectively perform its function in locking a shaft 6 against rotation in either direction. Thus, a cam slot or groove 18 is provided for a pin 19 on the clutch member 10 whereby a wedging force is obtained between said pin and slot to more effectively wedge the balls 12 against the seat 13, such a force being greater than if the clutch member 10 were merely slid longitudinally into locking position. The clutch member 10, therefore, is most effective for locking the shaft 6 in one direction. To lock said shaft against rotation in the other direction, a similar slot or groove 20 engaged with a pin 21 is employed for the other clutching member 11.

The unit device above described is intended to function to lock the shaft 6 when the vehicle is at rest, the force employed for moving the clutch members 10 and 11 into locking position being carried by means about to be described.

The cam shaft 22 or any other suitable moving member may be employed for operating a device such as the governor 23 which controls the position of a sleeve 24. Means such as a spring 25 may be employed for normally projecting the sleeve 24 as when the engine is inoperative, the centrifugal force generated by the rotating governor when the engine is operative, retracting said sleeve 24.

In the above manner, reciprocating movement is imparted to the sleeve 24, it being projected when the engine is idle and retracted when operating.

The movement of this sleeve may be employed for controlling the clutching members 10 and 11. One manner of accomplishing this is to provide a bracket 25a so positioned as not to interfere with the floor of the vehicle and to provide said bracket with a gear rack 26 arranged to drive a pinion 27 carried by a stud 28 mounted on the housing 15. The stud 28 may be provided with means such as a cam 29, in the present instance said cam being formed with opposed substantially identical lobes 30 and 31. The cam lobes 30 and 31 are so designed as to wedge the clutch members 10 and 11 apart when the engine is idle and to release said members so that the springs 16 and 17 may become effective to urge them toward each other.

From the above it may be seen that when the engine is not operating the spring 25 urges the sleeve 24 outwardly in projected position. The cam lobes 30 and 31 in this position of the sleeve 24 are arranged to force the clutch members 10 and 11 toward the respective seats 13 and 14 whereby the rollers 12 engage said seats. The movement of the clutch members as they are being forced into position by the cam, is both axial and rotational as imparted by the angle of the cam grooves 18 and 20. Thus, an effective lock is afforded for the shaft 6 which is held against rotation in either direction and thereby prevents accidental rolling of the parked vehicle.

The foregoing locking of the shaft occurs automatically upon stopping of rotation of the shaft 22 which ceases its rotation upon stopping of the operation of the engine.

When the vehicle is again to be driven, and the engine started, the rotation of the shaft 22 causes the centrifugal force of the governor to overcome the force of the spring 25. The sleeve 24 is, therefore, retracted and the cam 29 partially rotated as shown by the dot-dash lines of Fig. 3, to release pressure on the clutch members. The springs 16 and 17 now become effective to completely release contact between the clutch balls 12 and the seats 13 and 14. The vehicle may now be driven without interference by the locking means.

A vehicle thus effectively locked could not be easily moved should it become necessary to remove it from a dangerous site such as in the vicinity of a fire. Means are, therefore, provided whereby the locking means may be released, said means being either placed under the hood of the vehicle or within the front compartment where it is readily accessible. In the present instance, this means may merely comprise a handle 32 by means of which the sleeve 24 may be shifted to compress the spring 25 in the direction in which it is compressed by the centrifugal force of the governor. This handle may be locked in retracted position so that the car may either be rolled or driven away from the mentioned dangerous site.

From the foregoing, it may be seen that a simple, safe, and effective means has been provided for locking a parked car on a grade. It is obvious that the principles of the invention may be varied within the spirit and scope of the appended claims. It is, therefore, intended that this disclosure be considered as by way of example only.

What I claim as new and desire to secure by Letters Patent, is:

1. In an automotive vehicle having an engine and a member driven thereby, means for gripping said member to hold the same against rotation in both directions, means including said engine for rendering said gripping means ineffective, said means comprising a governor driven by said engine and spring means operating to effect release of said gripping means during operation of the engine and governor, and means for rendering said gripping means effective when and only when said engine is not operating.

2. In an automotive vehicle having an engine and a member driven thereby, means for gripping said member to hold the same against rotation in both directions, means including said engine for rendering said gripping means ineffective, said means comprising a governor driven by said engine and spring means operating to effect release of said gripping means during operation of the engine and governor, and means for rendering said gripping means effective when and only when said engine is not operating, said latter means including a spring and cam means controlled thereby to effect engagement of said gripping means.

3. In a device of the character described, a pair of shaft gripping units each comprising a fixed clutch member and a movable clutch member, means keying each movable clutch member to said shaft, and means for moving said movable clutch members positively into clutching engagement with the respective fixed clutch members, said keying means comprising oppositely arranged helical grooves in said shaft, and keys arranged in said grooves whereby the movable clutch members are oppositely rotated when moved into and out of engagement with the fixed clutch members.

JOSEPH LA VIA.